United States Patent
Yang

(10) Patent No.: US 11,962,858 B2
(45) Date of Patent: Apr. 16, 2024

(54) VIDEO PLAYBACK METHOD, VIDEO PLAYBACK TERMINAL, AND NON-VOLATILE COMPUTER-READABLE STORAGE MEDIUM

(71) Applicant: BIGO TECHNOLOGY PTE. LTD., Singapore (SG)

(72) Inventor: Jiahui Yang, Guangzhou (CN)

(73) Assignee: BIGO TECHNOLOGY PTE. LTD., Singapore (SG)

( * ) Notice: Subject to any disclaimer, the term of this patent is extended or adjusted under 35 U.S.C. 154(b) by 0 days.

(21) Appl. No.: 18/250,520

(22) PCT Filed: Oct. 28, 2020

(86) PCT No.: PCT/CN2020/124537
§ 371 (c)(1),
(2) Date: Apr. 25, 2023

(87) PCT Pub. No.: WO2022/087920
PCT Pub. Date: May 5, 2022

(65) Prior Publication Data
US 2023/0308724 A1    Sep. 28, 2023

(51) Int. Cl.
H04N 21/472    (2011.01)
H04N 21/2187    (2011.01)
H04N 21/2743    (2011.01)

(52) U.S. Cl.
CPC ... H04N 21/47217 (2013.01); H04N 21/2187 (2013.01); H04N 21/2743 (2013.01)

(58) Field of Classification Search
CPC ......... H04N 21/47217; H04N 21/2187; H04N 21/2743
See application file for complete search history.

(56) References Cited

U.S. PATENT DOCUMENTS

2019/0124400 A1    4/2019    Wang et al.
2021/0194836 A1    6/2021    Feng

FOREIGN PATENT DOCUMENTS

CA    2856285 A1    5/2013
CN    105635764 A    6/2016
(Continued)

OTHER PUBLICATIONS

International Search Report of the International Searching Authority for State Intellectual Property Office of the People's Republic of China in PCT application No. PCT/CN2020/124537 dated Jul. 19, 2021, which is an international application to which this application claims priority.

(Continued)

*Primary Examiner* — Girumsew Wendmagegn
(74) *Attorney, Agent, or Firm* — Kolitch Romano Dascenzo Gates LLC

(57) ABSTRACT

Provided is a video playback method, applicable to an anchor client. The method includes: displaying a video selection interface in response to a video display operation on a target account, wherein the video selection interface includes at least one video posted by the target account; sending a video playback request to a video server in response to a select operation on a target video in the video selection interface, wherein the video server is configured to transmit the target video to a live streaming server in response to the video playback request, and the live streaming server is configured to insert a video frame of the target video into a live streaming frame corresponding to the anchor client and push a live stream; and displaying the live streaming frame with the video frame inserted.

18 Claims, 12 Drawing Sheets

(56) References Cited

FOREIGN PATENT DOCUMENTS

| | | |
|---|---|---|
| CN | 106101808 A | 11/2016 |
| CN | 106534890 A | 3/2017 |
| CN | 107071502 A | 8/2017 |
| CN | 107317815 A | 11/2017 |
| CN | 108184136 A | 6/2018 |
| CN | 109104639 A | 12/2018 |
| CN | 111209417 A | 5/2020 |
| CN | 111669608 A | 9/2020 |
| CN | 113596553 A | 11/2021 |
| JP | 2012004991 A | 1/2012 |

OTHER PUBLICATIONS

The State Intellectual Property Office of People's Republic of China, First Office Action in Patent Application No. CN202080002528.6 dated May 5, 2022, which is a foreign counterpart application corresponding to this U.S. Patent Application.

The State Intellectual Property Office of People's Republic of China, Second Office Action in Patent Application No. CN202080002528.6 dated Dec. 9, 2022, which is a foreign counterpart application corresponding to this U.S. Patent Application.

VIDEO PLAYBACK METHOD, VIDEO PLAYBACK TERMINAL, AND NON-VOLATILE COMPUTER-READABLE STORAGE MEDIUM

CROSS-REFERENCE TO RELATED APPLICATION

The present disclosure is a U.S. national stage of international application No. PCT/CN2020/124537, filed on Oct. 28, 2020, the content of which is herein incorporated by reference in its entirety.

TECHNICAL FIELD

The present disclosure relates to the field of video live streaming technologies, and in particular, relates to a video playback method, a video playback terminal, and a non-volatile computer-readable storage medium.

BACKGROUND OF THE INVENTION

With the development of Internet technologies, nowadays, viewing live streams and videos has become important recreation, and thus many video applications have functions of both live streaming and video playback.

SUMMARY OF THE INVENTION

Some embodiments of the present disclosure provide a video playback method, a video playback terminal, and a non-volatile computer-readable storage medium. The technical solutions are as follows.

According to some embodiments of the present disclosure, a video playback method is provided. The method includes:

- displaying a video selection interface in response to a video display operation on a target account, wherein the video selection interface includes at least one video posted by the target account;
- sending a video playback request to a video server in response to a select operation on a target video in the video selection interface, wherein the video server is configured to transmit the target video to a live streaming server in response to the video playback request, and the live streaming server is configured to insert a video frame of the target video into a live streaming frame corresponding to the anchor client and push a live stream; and
- displaying the live streaming frame with the video frame inserted.

According to some embodiments of the present disclosure, a video playback method is provided. The method includes:

- sending a stream pull request to a live streaming server, wherein the stream pull request is configured to request the live streaming server to push a live stream;
- receiving pushed live stream data from the live streaming server; and
- displaying a live streaming frame based on the pushed live stream data, wherein a video frame of a target video is inserted into the live streaming frame, the target video being a video posted by a target account and selected by the anchor client.

According to some embodiments of the present disclosure, a non-volatile computer-readable storage medium is provided. The non-volatile computer-readable storage medium stores at least one instruction, at least one program, a code set, or an instruction set therein, wherein the at least one instruction, the at least one program, the code set, or the instruction set, when loaded and executed by a processor, causes the processor to perform the video playback methods as described above.

According to some embodiments of the present disclosure, a computer program product or a computer program is provided. The computer program product or the computer program includes one or more computer instructions, wherein the one or more computer instructions are stored in a non-volatile computer-readable storage medium. The one or more computer instructions, when loaded and executed by a processor of a video playback terminal from the non-volatile computer-readable storage medium, cause the video playback terminal to perform the video playback methods as described above.

DETAILED DESCRIPTION

The present disclosure is described in further detail with reference to the accompanying drawings, to clearly present the objects, technical solutions, and advantages of the present disclosure.

In some practices, the video playback function and the live streaming function are independent of each other. That is, users cannot view the live streams when viewing the video or users cannot view the video when viewing the live streams. For anchors, they need to use devices other than the live streaming terminal when displaying videos to viewers during live streaming, and thus the display effect is poor.

Figure 1:
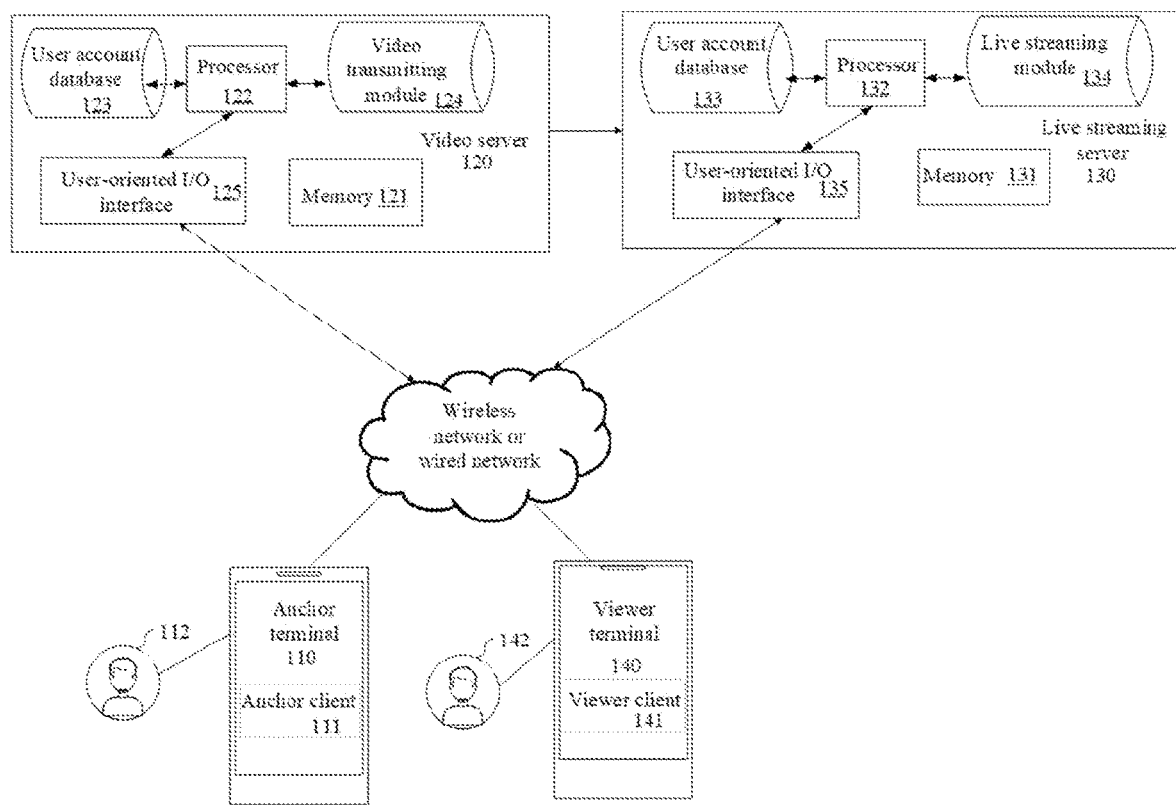
FIG. 1 is a schematic diagram of an implementation environment according to some exemplary embodiments of the present disclosure.

FIG. 1 is a schematic diagram of an implementation environment according to some exemplary embodiments of the present disclosure. Referring to FIG. 1, the implementation environment includes an anchor terminal 110, a video server 120, a live streaming server 130, and a viewer terminal 140.

The anchor terminal 110 is installed and running with an anchor client 111. The anchor terminal 110 is a smartphone, a tablet computer, a personal computer, or a portable computer, which is not limited herein.

The anchor terminal 110 is a terminal used by an anchor 112, that is, a stream pushing terminal. The anchor 112 creates a live streaming room and performs live streaming using the anchor terminal 110. During live streaming, the anchor client 111 captures images by a built-in or external camera and performs video encoding on the captured images, and sends a live video stream acquired upon the encoding to the live streaming server 130.

The anchor terminal 110 is connected to the live streaming server 130 over a wired or wireless network.

The live streaming server 130 is a server configured to push a live stream, which is a single server, a server cluster of several servers, or a cloud computing center.

In some embodiments, the live streaming server 130 includes a memory 131, a processor 132, a user account database 133, a live streaming module 134, and a user-oriented input/output (I/O) interface 135. The processor 132 is configured to load one or more instructions stored in the memory 131 and process data in the user account database 133 and the live streaming module 134. The user account database 133 is configured to store data of a user account used by each terminal, such as an avatar of the user account, a user name of the user account, and an identifier of a live streaming room corresponding to the user account. The live streaming module 134 is configured to receive the live video stream transmitted by the anchor terminal 110 and transmit the live video stream to the viewer terminal 140. The user-oriented I/O interface 135 is configured to establish communication and exchange data with external devices over a wireless network or a wired network.

The viewer terminal 140 is connected to the live streaming server 130 over a wired or wireless network.

A viewer client 141 is installed and run on the viewer terminal 140. The viewer terminal 140 is a smartphone, a tablet computer, a personal computer, or a portable computer, which is not limited herein.

The viewer terminal 140 is a terminal used by a viewer, that is, a stream pulling terminal. During viewing live streaming, in the case that a user selects to enter a live streaming room through the viewer client 141, the viewer client 141 pulls a live video stream corresponding to the live streaming room from the live streaming server 130 and performs video decoding on the live video stream, such that live streaming frames of the live streaming room are displayed.

In some embodiments of the present disclosure, to display videos during live streaming, the anchor terminal 110 is further connected to the video server 120 over a wired network or a wireless network, and the video server 120 is connected to the live streaming server 130.

The video server 120 is a server configured to provide a video playback service, which is a single server, a server cluster of several servers, or a cloud computing center. In some possible implementations, the video server 120 is a server in the clients (the anchor client or the viewer client) installed in the anchor terminal 110 and the viewer terminal 140. The video server 120 is configured to provide a video function. The video displayed by the video server 120 is a short or long video.

In some embodiments, the video server 120 includes a memory 121, a processor 122, a user account database 123, a video transmitting module 124, and a user-oriented input/output (I/O) interface 125. The processor 122 is configured to load one or more instructions stored in the memory 121 and process data in the user account database 123 and the video transmitting module 124. The user account database 123 is configured to store data of a user account used by each terminal, such as an avatar of the user account, a user name of the user account, and the like. The video transmitting module 124 is configured to receive a video playback request sent by external devices and transmit a video stream to the external devices in response to the video playback request. The user-oriented I/O interface 125 is configured to establish communication and exchange data with the external devices over a wireless network or a wired network.

In some possible application scenarios, in the case that the anchor selects a target video to be inserted into the live streaming through the anchor terminal 110, the anchor terminal 110 sends a video playback request to the video server 120, and the video server 120 sends the target video to the live streaming server 130. Upon receiving the target video and the live video stream from the anchor terminal 110, the live streaming server 130 performs a combining process on a video frame of the target video and a live streaming frame of the live video stream, that is, combines the target video and the live video stream into one video stream, and sends the combined video stream to the viewer terminal 140. The viewer client in the viewer terminal 140 decodes the combined video stream for display. In this way, the viewer of the viewer client is capable of viewing the target video to be displayed by the anchor while viewing the live stream.

Figure 2:
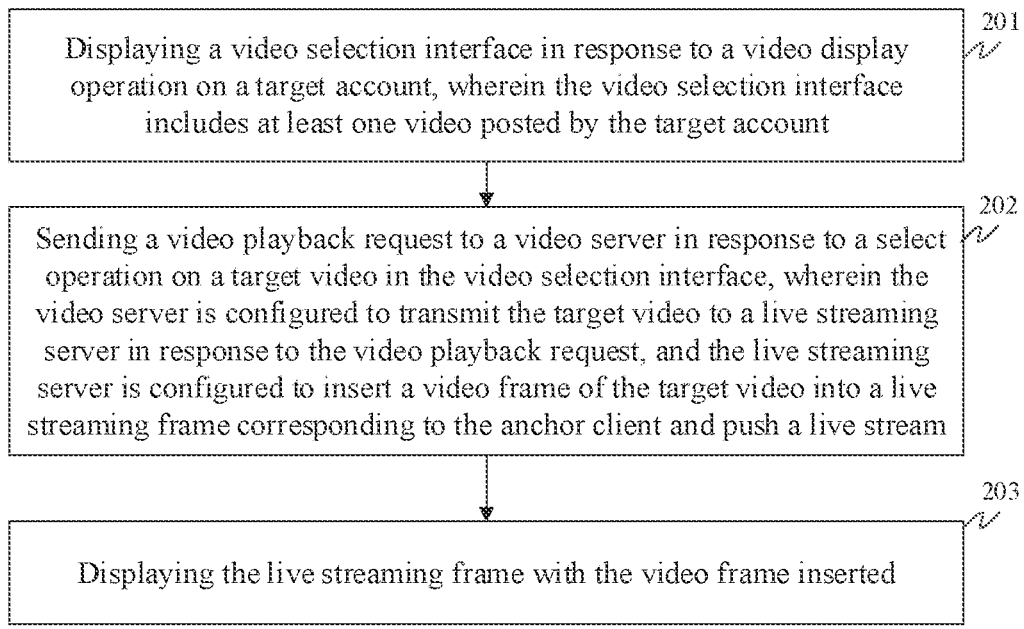
FIG. 2 is a flowchart of a video playback method according to some exemplary embodiments of the present disclosure.

FIG. 2 is a flowchart of a video playback method according to some exemplary embodiments of the present disclosure. Referring to FIG. 2, descriptions are given using a scenario where the method is applied in the implementation environment as illustrated in FIG. 1 as an example. The method includes the following steps.

In step 201, a video selection interface is displayed in response to a video display operation on a target account. The video selection interface includes at least one video posted by the target account.

The target account is a user account that has posted at least one video. The user account is an anchor account corresponding to an anchor client, a viewer account corresponding to a viewer client in a live streaming room, or another user account.

Optionally, in response to receiving the video display operation for the target account during live streaming, the anchor client displays the video selection interface in a full-screen manner or displays the video selection interface in a partial display region on an upper portion of a live streaming frame.

Optionally, an image corresponding to the video, such as a screenshot of the video, and/or texts corresponding to the video, such as video description information, and/or video playback information, such as video playback times and video playback durations are displayed in the video selection interface. The contents in the video selection interface are arranged in an array or in a list form, which is not limited herein.

In step 202, a video playback request is sent to a video server in response to a select operation on a target video in the video selection interface. The video server is configured to transmit the target video to a live streaming server in response to the video playback request, and the live streaming server is configured to insert a video frame of the target video into a live streaming frame corresponding to the anchor client and push a live stream.

Optionally, the select operation is a touch operation (e.g., a double-click operation) or a voice command corresponding to the target video, which is not limited herein.

In some possible implementations, the video playback request includes a video identifier of the target video and an identifier of a live streaming room. The identifier of the live streaming room is a unique identifier of the live streaming room created by the anchor client. For example, the video playback request includes a video ID and a live streaming room ID.

Accordingly, to inform the live streaming server in which live streaming room the video frame is inserted into the live streaming frame, the video server sends the identifier of the live streaming room to the live streaming server when transmitting the target video to the live streaming server.

In some possible implementations, the live streaming server acquires a target video stream from the video server and a live video stream from the anchor terminal, and combines these two video streams into one video stream according to a predetermined layout, such that the video frame of the target video is inserted into the live streaming frame, and thus the live streaming frame and the video frame are arranged in the predetermined layout. The predetermined layout is a top-down layout, a left-right layout, or an embedded layout.

Further, the live streaming server sends to each of the viewer clients the live video stream with the live streaming frame inserted, and the viewer client decodes the live video stream for display.

In step 203, the live streaming frame with the video frame inserted is displayed.

Optionally, the live streaming server sends live stream data to both the viewer client and the anchor client, and accordingly, the anchor client decodes the live stream data for display, such that the anchor is capable of synchronously viewing a playback progress of the target video during live streaming.

Figure 3:
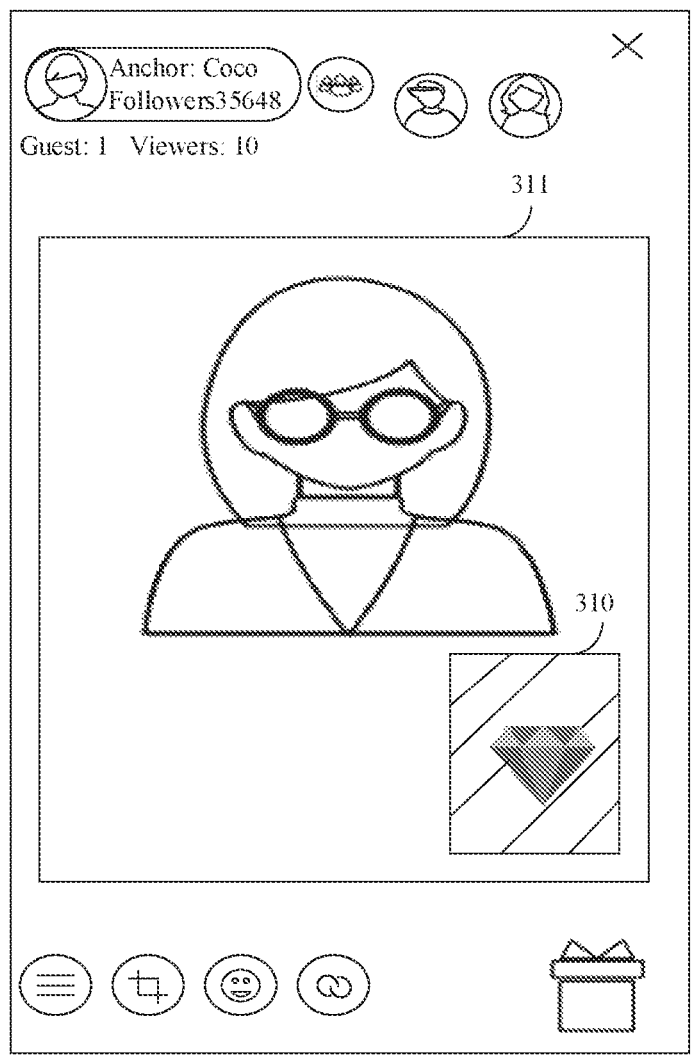
FIG. 3 is a schematic diagram of a live streaming frame with a video frame inserted according to some exemplary embodiments of the present disclosure.

Schematically, as illustrated in FIG. 3, by decoding the live stream data, the anchor client displays the video frame 310 of the target video in a form of a window at a bottom-right corner of the live streaming frame 311 while displaying the live streaming frame 311.

In summary, in the embodiments of the present disclosure, in the case that a video needs to be displayed to viewers during live streaming, the anchor client displays the video selection interface based on the video display operation and determines the target video to be displayed in response to the select operation, such that the video playback request is sent to the video server; and the video server transmits the target video to the live streaming server in response to the video playback request, such that the live streaming server inserts the video frame of the target video into the live streaming frame. Therefore, the viewer of the viewer client is capable of viewing the target video to be displayed by the anchor while viewing the live stream. In the video playback process, the anchor displays the video with only one set of live streaming device, which simplifies the video display process; and the live streaming server pushes to each client the live stream data with the video frame inserted, which improves the quality of displaying the video.

Figure 4:
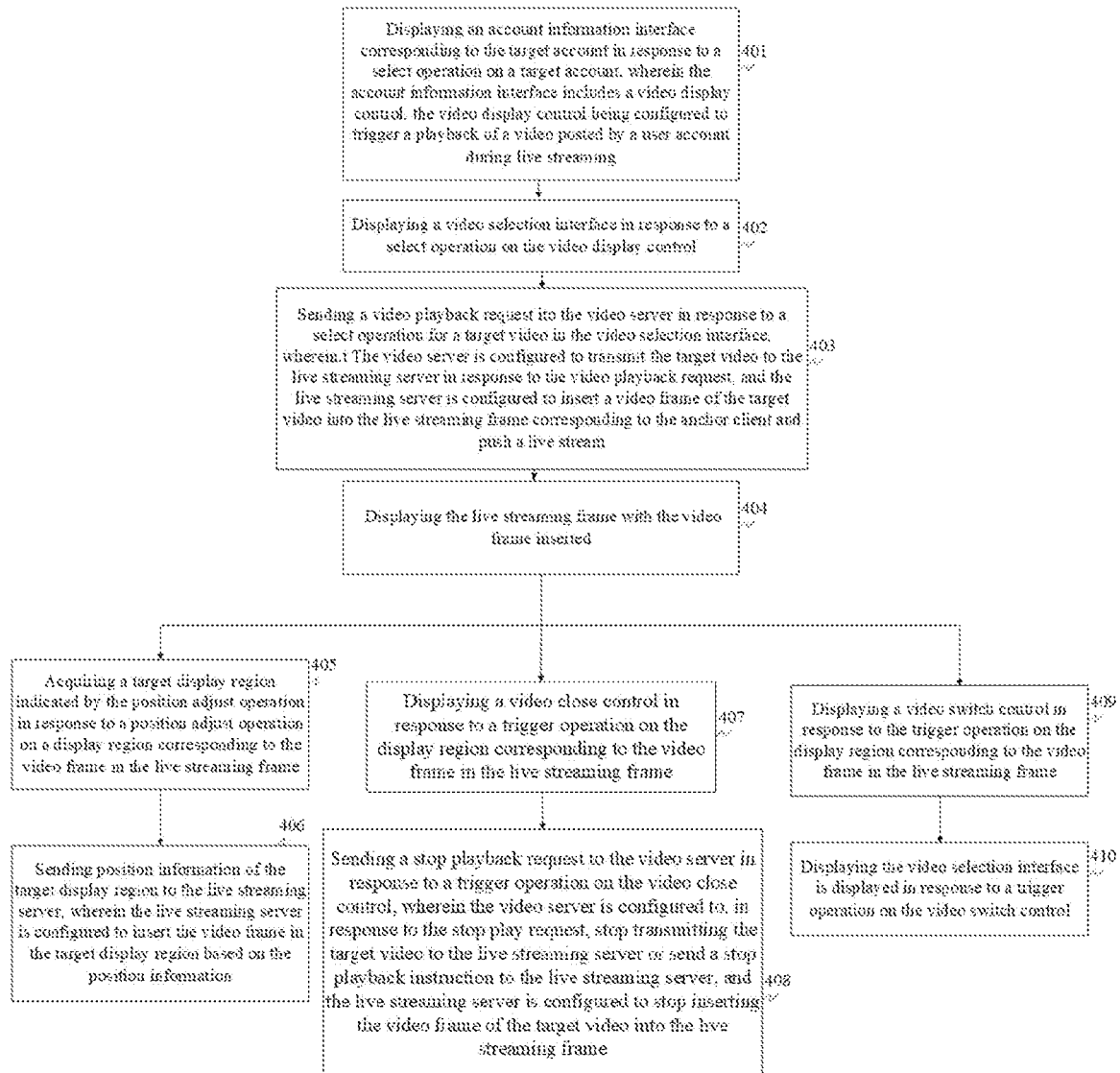
FIG. 4 is a flowchart of a video playback method according to other exemplary embodiments of the present disclosure.

FIG. 4 is a flowchart of a video playback method according to other exemplary embodiments of the present disclosure. Referring to FIG. 4, descriptions are given using a scenario where the method is applied in the anchor terminal (the anchor client) of the implementation environment as illustrated in FIG. 1 as an example. The method includes the following steps.

In step 401, an account information interface corresponding to the target account is displayed in response to a select operation on a target account. The account information interface includes a video display control, wherein the video display control is configured to trigger a playback of a video posted by a user account during live streaming.

Optionally, the anchor terminal displays the account information interface corresponding to the target account in response to a click operation on an avatar corresponding to the target account in an interface of a live streaming frame.

A typical account information interface generally includes an avatar of the user, basic information such as the user's name, gender, and age, controls for communicating with the user corresponding to the account, and controls for following the account. However, the account information interface herein further includes the video display control, and the anchor is capable of selecting to insert a video of the viewer into the live streaming by triggering the control.

Figure 5:
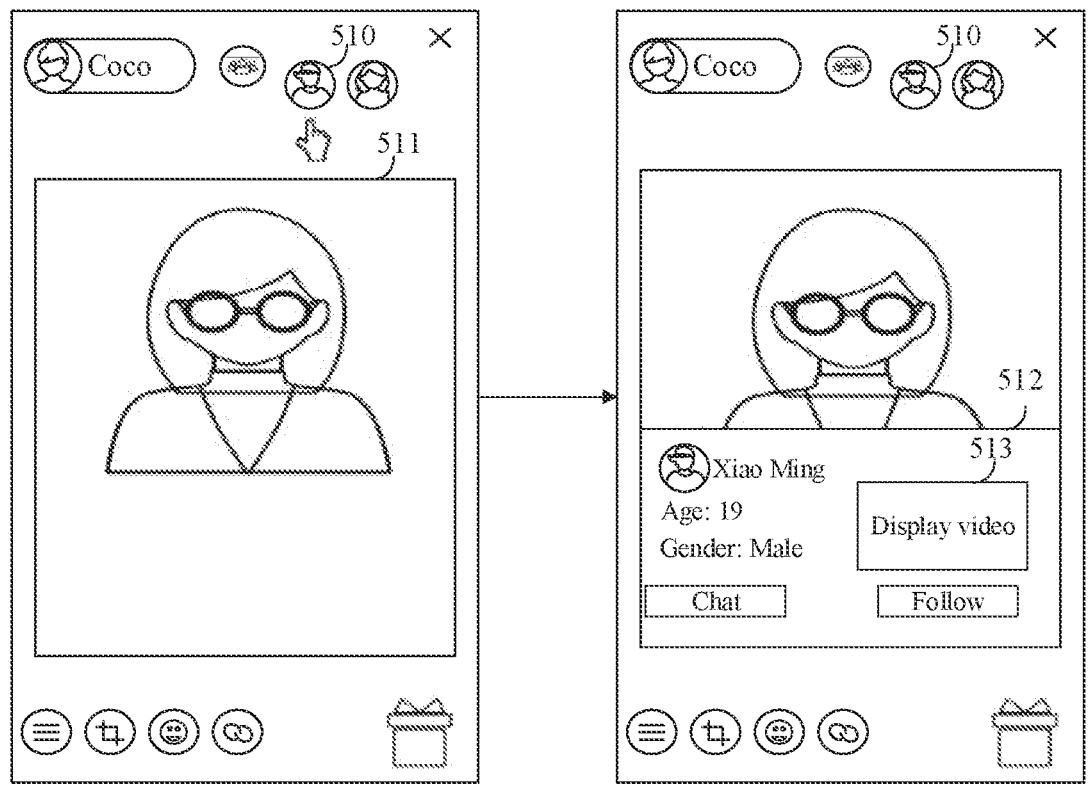
FIG. 5 is a schematic diagram of displaying an account information interface according to some exemplary embodiments of the present disclosure.

As illustrated in FIG. 5, in the case that the anchor clicks on an avatar 510, an account information interface 512 corresponding to the avatar 510 appears at a lower part of a live streaming frame 511, and a video display control 513 is in the account information interface 512.

A user account corresponding to the target account is any viewer account in a live streaming room, a specific viewer account filtered in certain ways, or an anchor account.

In some possible implementations, the target account is selected by the anchor from a viewer ranking list by the following steps.

The anchor client displays the viewer ranking list. The viewer ranking list includes at least one viewer account, and a display order of the at least one viewer account is determined according to the number of virtual items contributed in the live streaming room.

The anchor client displays the account information interface corresponding to the target account in response to the select operation on the target account in the viewer ranking list.

Optionally, the anchor client displays the viewer ranking list in response to a trigger operation on a display control of the viewer ranking list in the live streaming interface.

In some possible implementations, the anchor client displays the account information interface corresponding to the target account in response to a click operation on an account identifier (e.g., the name, the avatar, and the like) corresponding to the target account in the viewer ranking list. Account information of the target account is acquired from the live streaming server or the video server.

The viewer accounts in the viewer ranking list are all viewer accounts that have contributed virtual items in the live streaming room, or viewer accounts that have contributed virtual items (of which the number exceeds a threshold) in the live streaming room, or top N (N is a positive integer) viewer accounts that have contributed the largest number of virtual items in the live streaming room, which are not limited herein. The virtual items include virtual coins, virtual flowers, virtual props, and the like. The more virtual items a viewer account contributes in the live streaming room, the higher the viewer account is displayed in the viewer ranking list. Because more virtual items indicate that the viewer has a stronger demand that its video needs to be displayed by the anchor, the anchor easily finds an account of the above viewer through the viewer ranking list.

Figure 6:
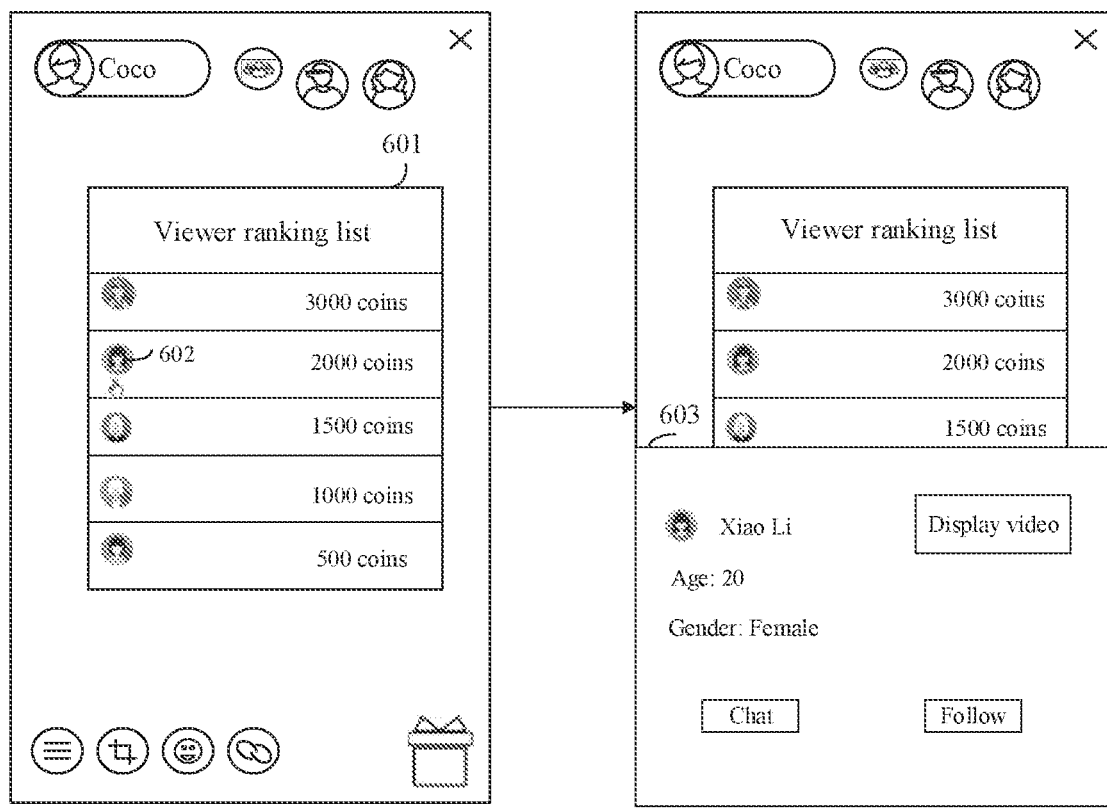
FIG. 6 is a schematic diagram of an interface of a process that an anchor selects a viewer account from a viewer ranking list according to some exemplary embodiments of the present disclosure.

As illustrated in FIG. 6, avatars corresponding to the top five viewer accounts in terms of the number of virtual coins contributed are displayed in a viewer ranking list 601. In the case that the anchor clicks on a viewer avatar 602, an account information interface 603 corresponding to the viewer avatar 602 is displayed at a lower part of the screen.

In step 402, a video selection interface is displayed in response to a select operation on the video display control.

Optionally, the anchor client sends a video list acquire request to the video server in response to the select operation on the video display control. The video list acquire request includes the account identifier of the target account. The video server is configured to acquire a video list based on the account identifier of the target account and feedback the video list to the anchor client. The anchor client displays videos in the video list in the video selection interface.

Figure 7:
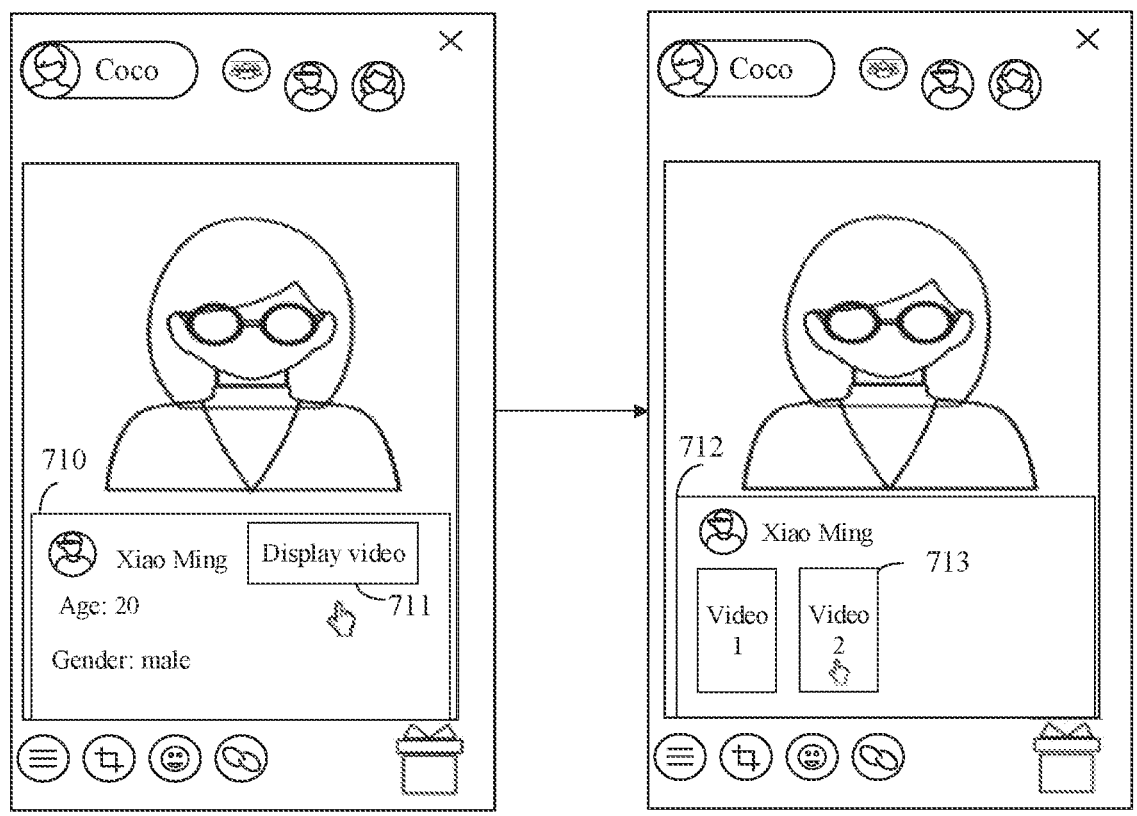
FIG. 7 is a schematic diagram of an interface of a process of selecting a video according to some exemplary embodiments of the present disclosure.

As illustrated in FIG. 7, a video display control 711 is displayed in an account information interface 710. In the case that the anchor clicks on the video display control 711, a video list 712 is displayed on the screen of the anchor terminal. The anchor is capable of selecting a video 713 by clicking on the video 713 in the video list 712.

In step 403, a video playback request is sent to the video server in response to a select operation for a target video in the video selection interface. The video server is configured to transmit the target video to the live streaming server in response to the video playback request, and the live streaming server is configured to insert a video frame of the target video into the live streaming frame corresponding to the anchor client and push a live stream.

For the implementation of step 403, reference is made to step 202, which is not repeated herein.

In step 404, the live streaming frame with the video frame inserted is displayed.

For the implementation of step 404, reference is made to step 203, which is not repeated herein.

In step 405, a target display region indicated by the position adjust operation is acquired in response to a position adjust operation on a display region corresponding to the video frame in the live streaming frame.

In some possible implementations, the video frame is displayed in a default position of the live streaming frame, such as a bottom-right corner or a bottom-left corner of the live streaming frame. However, in some possible implementations, the position of the video frame blocks contents of the live streaming frame, such as the anchor's face, the anchor's body movement, or the product promoted by the anchor, which affects the viewers' experience of viewing the live stream. To address this issue, the anchor is capable of manually adjusting the position of the video frame. In some possible implementations, the anchor long presses the video frame and performs a drag operation, and the anchor client determines a position where a drag signal ends as the target display region.

Optionally, during the drag operation, a virtual region box is displayed in the live streaming frame, wherein a size of the virtual region box is equal to a size of the video frame, and a position of the virtual region box changes as a position of the drag signal changes. A display position of the dragged video frame is indicated by displaying the virtual region box.

It should be noted that the anchor also adjusts a display size of the video frame by an adjust operation. In some possible implementations, in response to a drag operation on the edges of the video frame, the anchor client determines a scaling mode and a scaling size of the video frame according to a drag direction and a drag distance of the drag operation.

In step 406, position information of the target display region is sent to the live streaming server. The live streaming server is configured to insert the video frame in the target display region based on the position information.

In some possible implementations, the position information includes a range of coordinates corresponding to the target display region. The live streaming server determines a display region of the adjusted video frame in the live streaming frame based on the range of the coordinates to combine the video frame and the live streaming frame of the live video stream, and sends the live video stream with the video frame inserted to the anchor client.

Figure 8:
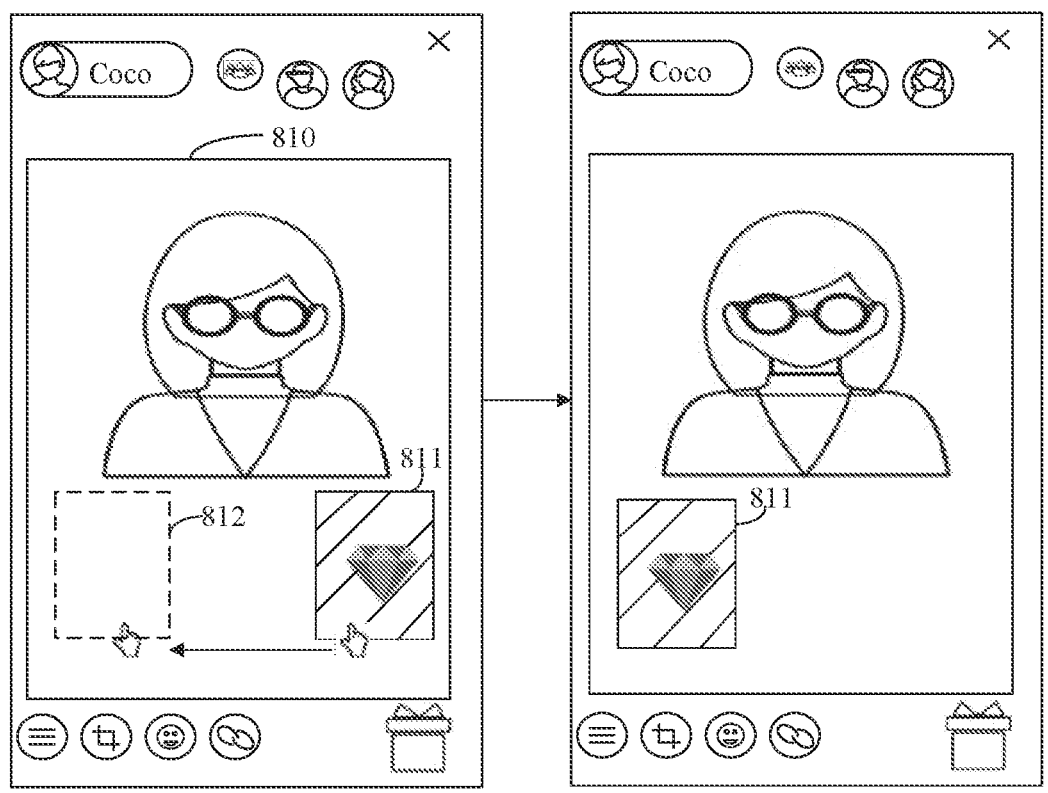
FIG. 8 is a schematic diagram of an interface of a process of adjusting a position of a video frame according to some exemplary embodiments of the present disclosure.

As illustrated in FIG. 8, the anchor long presses a position of a video frame 811, drags the position to the left, and stops dragging at a target position 812. The anchor client sends a range of coordinates of the target display region centered on the target position 812 to the live streaming server. The live streaming server combines the video frame and the live streaming frame of the live video stream based on the range of the coordinates and sends the combined live video stream to the anchor terminal. The anchor client displays the video frame 811 within the target display region centered on the target position 812.

In step 407, a video close control is displayed in response to a trigger operation on the display region corresponding to the video frame in the live streaming frame.

Optionally, the video inserted into the live streaming frame is automatically looped. The playback of the video is stopped, in the case that the loop reaches a predetermined number of times, or the anchor actively stops the playback of the video.

The trigger operation includes a touch operation (e.g., a click operation) on any position of the video frame, or a touch operation on a display position corresponding to the video close control in the video frame, such as an upper-left or upper-right corner of the frame.

Figure 9:
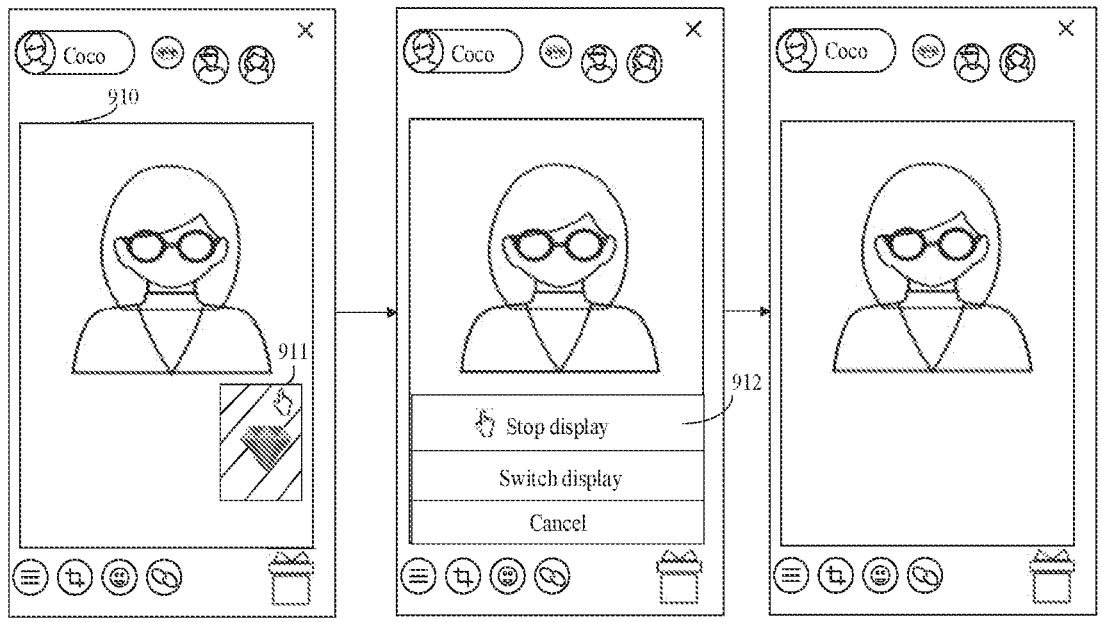
FIG. 9 is a schematic diagram of an interface of a process of closing a video according to some exemplary embodiments of the present disclosure.

As illustrated in FIG. 9, in the case that the anchor clicks at a position of a video frame 911, a stop display control 912 configured to stop displaying the video frame is displayed on the screen.

In step 408, a stop playback request is sent to the video server in response to a trigger operation on the video close control. The video server is configured to, in response to the stop play request, stop transmitting the target video to the live streaming server or send a stop playback instruction to the live streaming server. The live streaming server is configured to stop inserting the video frame of the target video into the live streaming frame.

In the case that the target video has not been completely transmitted to the live streaming server, the video server stops transmitting the target video to the live streaming server. In this way, the live streaming server cannot combine the target video and the live stream into a video stream, and thus cannot transmit the combined video stream to the viewer terminal and is only capable of transmitting the live stream. Therefore, only the live streaming frame is displayed on the viewer terminal.

In the case that the target video has been completely transmitted to the live streaming server and the live streaming server inserts the video frame into the live streaming frame based on video data locally cached, the video server sends the stop playback instruction to the live streaming server, and the video server stops combining the target video and the live stream and transmits only the live stream to the viewer terminal.

As illustrated in FIG. 9, the anchor terminal sends the stop playback request to the video server in response to a click operation of the anchor on a stop display control 912. In this case, the anchor terminal stops displaying the video frame 911 on the screen, and only displays a live streaming frame 910 without displaying the video frame.

In step 409, a video switch control is displayed in response to the trigger operation on the display region corresponding to the video frame in the live streaming frame.

In some possible implementations, during the playback of the video, in the case that the video being displayed needs to be switched, the anchor performs a trigger operation on a display region corresponding to the video frame to trigger the display of the video switch control, such that the video being displayed in the live streaming is switched by the video switch control.

Figure 10:
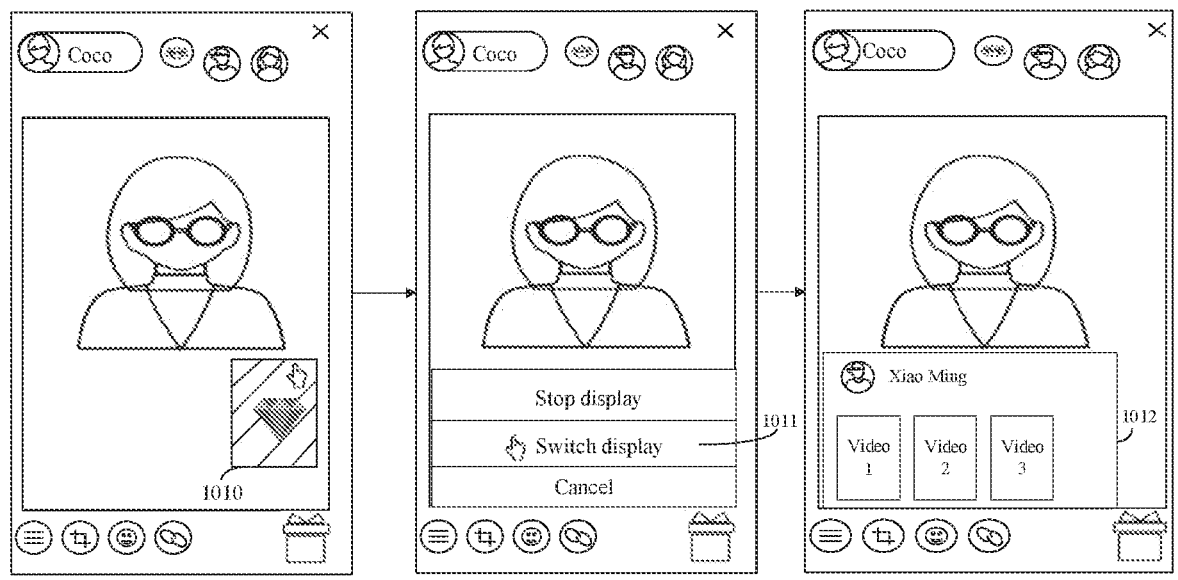
FIG. 10 is a schematic diagram of an interface of a process of switching a video according to some exemplary embodiments of the present disclosure.

As illustrated in FIG. 10, in the case that the anchor performs a click operation on a position of a video frame 1011, a switch display control 1011 configured to switch a display of the video frame 1011 is displayed on the screen In step 410, the video selection interface is displayed in response to a trigger operation on the video switch control.

As illustrated in FIG. 10, the anchor client displays a video selection interface 1012 on the screen in response to the click operation of the anchor on the switch display control 1011 in a live streaming frame 1010. The video selection interface 1012 includes at least one video that is to be displayed upon switching.

Further, the anchor client sends a video playback request to the video server in response to a select operation on a video in the video selection interface, wherein the video playback request includes a video identifier corresponding to the selected video. In this way, a switchover between the video being displayed and the video to be displayed in the live streaming frame is achieved.

In summary, in the embodiments, the anchor terminal sends the video list acquire request to the video server in response to the select operation on the video display control in the account information interface, then the video server acquires the video list based on the account identifier of the target account and sends the video list to the anchor terminal, and the videos in the video list are displayed in the video selection interface. In this way, the anchor is capable of acquiring the videos without exiting the live streaming room, which improves the efficiency of the anchor in acquiring the videos to be displayed.

The anchor terminal acquires the target display region indicated by the position adjust operation in response to the position adjust operation on the display region corresponding to the video frame in the live streaming frame, and sends the position information of the target display region to the live streaming server. The live streaming server inserts the video frame in the target display region based on the position information. In this way, the anchor is capable of adjusting the position of the video frame to prevent important things in the live streaming room from being blocked.

The anchor terminal sends the stop playback request to the video server in response to the trigger operation on the video close control, and the live streaming server stops inserting the video frame of the target video into the live streaming frame. In this way, the anchor is capable of freely stopping the display of the video frame.

The live streaming server displays the video selection interface in response to the trigger operation on the video switch control. In this way, the anchor is capable of directly selecting the video to be displayed upon switching in the video selection interface without performing the trigger operation on the target account and performing the trigger operation on the video display control in the account information interface corresponding to the target account, which improves the efficiency in switching videos.

In some possible implementations, the account information interface corresponding to the target account further includes a search control. The anchor client acquires an account to be searched using the search control, and thus an account information interface corresponding to the account to be searched is displayed, which is convenient for the anchor to select videos posted by other users for display.

Figure 11:
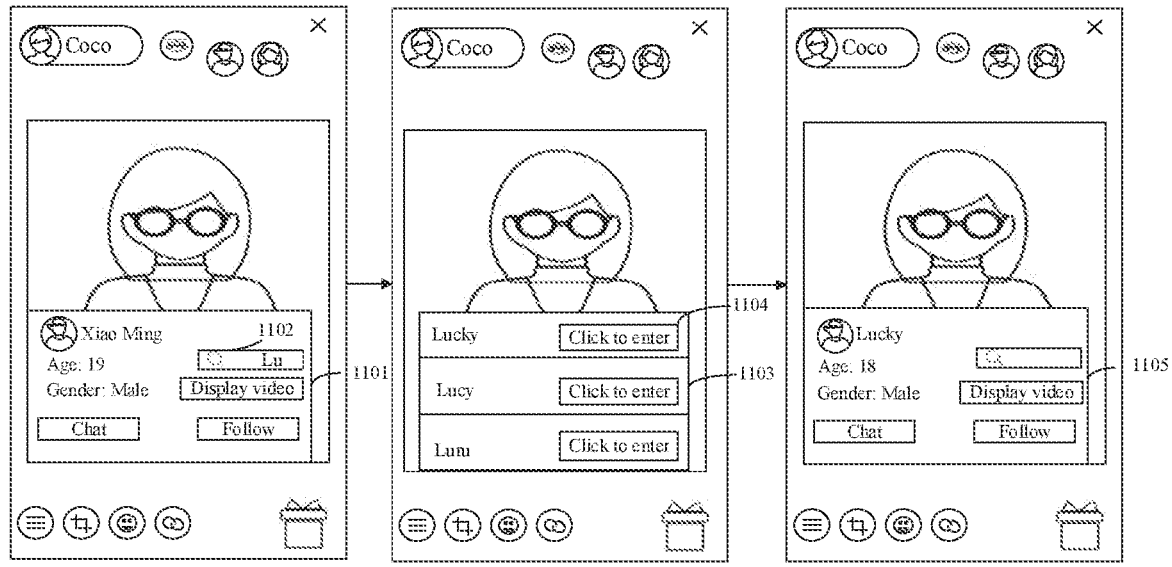
FIG. 11 is a schematic diagram of an interface of a process of searching for an account according to some exemplary embodiments of the present disclosure.

As illustrated in FIG. 11, a search control 1102 is displayed in an account information interface 1101. In the case that the anchor enters the initial letters "Lu" of the account to be searched using the search control 1102, an account list interface 1103 (including at least one account beginning with Lu) is displayed by the anchor client. In response to receiving a click operation on a selection control 1104 corresponding to an account "Lucky," the anchor client determines the account "Lucky" as the account to be searched, and then displays an account information interface 1105 corresponding to the account to be searched "Lucky."

Figure 12:
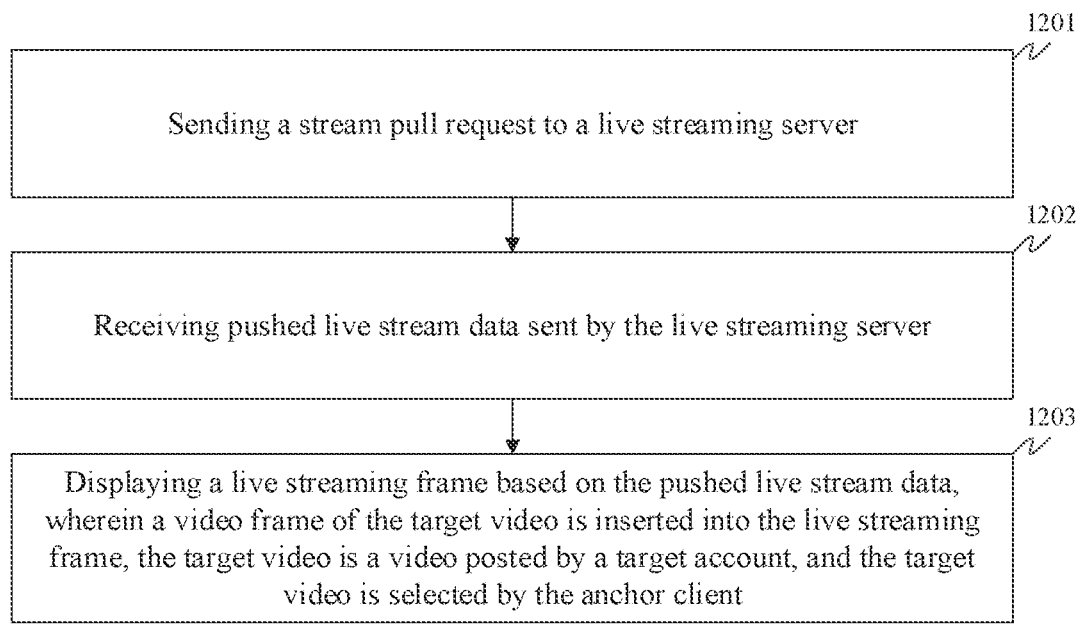
FIG. 12 is a flowchart of a video playback method according to some exemplary embodiments of the present disclosure.

FIG. 12 is a flowchart of a video playback method according to some exemplary embodiments of the present disclosure. Descriptions are given using a scenario where the method is applicable to the viewer terminal (the viewer client) in the implementation environment illustrated in FIG. 1 as an example. Referring to FIG. 12, the method includes the following steps.

In step 1201, a stream pull request is sent to a live streaming server.

Optionally, the stream pull request includes an identifier of a live streaming room.

In the case that a viewer selects a live streaming room to access from a live streaming list by the viewer client, the viewer client sends the stream pull request to the live streaming server, so as to subsequently pull a live video stream corresponding to the selected live streaming room from the live streaming server.

In step 1202, pushed live stream data sent by the live streaming server is received. In some embodiments, the pushed live stream data includes video stream data and audio stream data, wherein the video stream data is a video stream acquired upon the combination of a target video and a live stream by the live streaming server.

In step 1203, a live streaming frame is displayed based on the pushed live stream data. A video frame of the target video is inserted into the live streaming frame. The target video is a video posted by a target account, and the target video is selected by the anchor client.

The target video is a video transmitted by a video server to the live streaming server in response to a video playback request sent by the anchor terminal.

In summary, in the embodiments of the present disclosure, the viewer client pulls the video stream, which is combined by the live stream and the video stream, from the live streaming server, and the viewer client decodes the combined video stream for display. In this way, the viewer is capable of viewing the video to be displayed by the anchor while viewing the live stream, which improves the effect of viewing videos.

Figure 13:
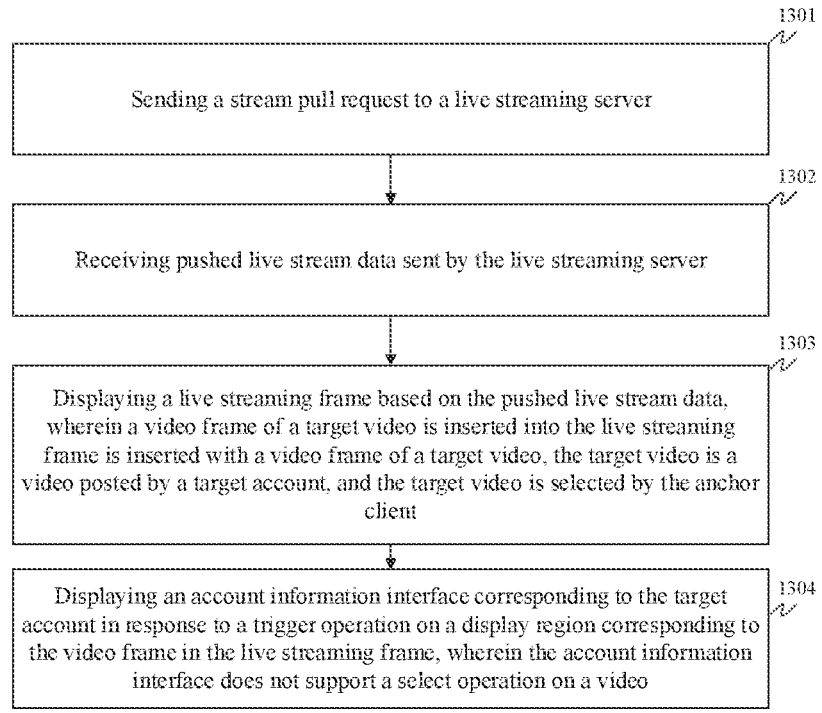
FIG. 13 is a flowchart of a video playback method according to some exemplary embodiments of the present disclosure.

FIG. 13 is a flowchart of a video playback method according to some exemplary embodiments of the present disclosure. Descriptions are given using a scenario where the method is applicable to the viewer terminal (the viewer client) in the implementation environment illustrated in FIG. 1 as an example. Referring to FIG. 13, the method includes the following steps.

In step 1301, a stream pull request is sent to a live streaming server.

For the implementation of step 1301, reference is made to step 1201, which is not repeated herein.

In step 1302, pushed live stream data sent by the live streaming server is received.

For the implementation of step 1302, reference is made to step 1202, which is not repeated herein.

In step 1303, a live streaming frame is displayed based on the pushed live stream data. The live streaming frame is inserted with a video frame of a target video. The target video is a video posted by a target account, and the target video is selected by the anchor client.

For the implementation of step 1303, reference is made to step 1203, which is not repeated herein.

In step 1304, an account information interface corresponding to the target account is displayed in response to a trigger operation on a display region corresponding to the video frame in the live streaming frame. The account information interface does not support a select operation on a video.

The viewers are a group of users viewing videos and live streams. The viewer client does not need the function of inserting a video frame into the live streaming frame for display to other people. Therefore, the account information interface triggered to be displayed in the viewer client does not support the select operation on the video. That is, the account information interface does not include a video display control.

Optionally, the account information interface of the viewer client supports operations configured specifically for the viewers, such as a direct message operation and a follow operation.

Figure 14:
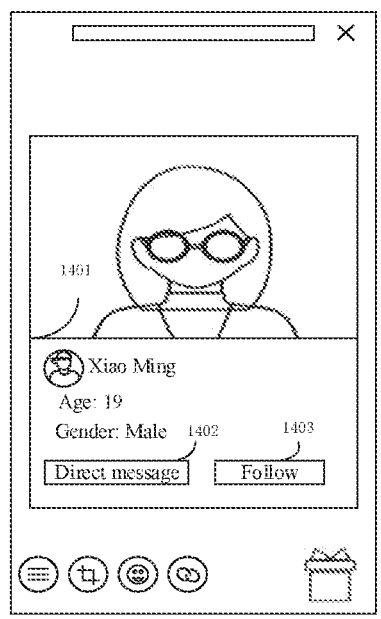
FIG. 14 is a schematic diagram of an interface of displaying an account information interface on a viewer terminal according to some exemplary embodiments of the present disclosure.

As illustrated in FIG. 14, the viewer first triggers a display of an account information interface 1401 by clicking on the display region corresponding to the video frame, and the account information interface 1401 is displayed in the viewer client. The account information interface 1401 includes a direct message control 1402 and a follow control 1403, but does not include the video display control. Therefore, during accessing the account information interface 1401, the viewer sends direct messages to the account and follows the account by triggering the direct message control 1402 and the follow control 1403, but cannot the video being displayed in the current live streaming frame.

In the case that the anchor displays a video posted by a viewer in a live streaming room, the viewer is known to other viewers. Other viewers are capable of communicating directly with the viewer or following the viewer's account by clicking on the viewer's video, which improves the efficiency of online social networking.

Figure 15:
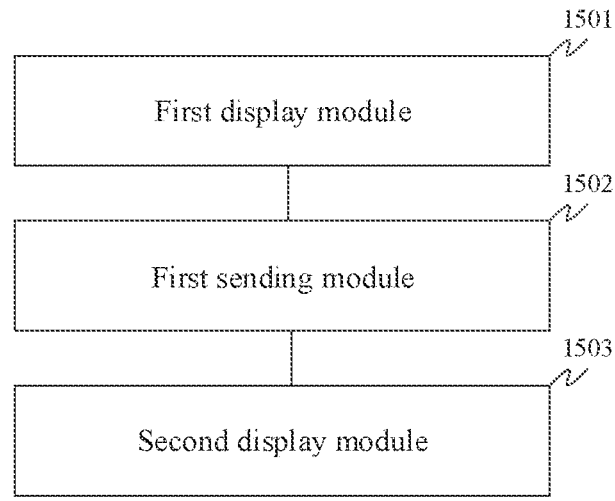
FIG. 15 is a schematic structural diagram of a video playback apparatus according to some exemplary embodiments of the present disclosure.

FIG. 15 is a schematic structural diagram of a video playback apparatus according to some exemplary embodiments of the present disclosure. Referring to FIG. 15, the apparatus includes a first display module 1501, a first sending module 1502, and a second display module 1503.

The first display module 1501 is configured to display a video selection interface in response to a video display operation on a target account. The video selection interface includes at least one video posted by the target account.

The first sending module 1502 is configured to send a video playback request to a video server in response to a select operation on a target video in the video selection interface. The video server is configured to transmit the target video to a live streaming server in response to the video playback request, and the live streaming server is configured to insert a video frame of the target video into a live streaming frame corresponding to the anchor client and push a live stream.

The second display module 1503 is configured to display the live streaming frame with the video frame inserted.

Optionally, the first display module 1501 includes a first display unit and a second display unit.

The first display unit is configured to display an account information interface corresponding to the target account in response to a select operation on the target account. The account information interface includes a video display control, wherein the video display control is configured to trigger a playback of a video posted by a user account during live streaming.

The second display unit is configured to display the video selection interface in response to a select operation on the video display control.

Optionally, the first display unit is further configured to: display a viewer ranking list, wherein the viewer ranking list includes at least one viewer account, and a display order of the at least one viewer account is determined according to the number of virtual items contributed in a live streaming room; and display the account information interface corresponding to the target account in response to the select operation on the target account in the viewer ranking list.

Optionally, the second display unit is further configured to send a video list acquire request to the video server in response to the select operation on the video display control, wherein the video list acquire request includes an account identifier of the target account; and the video server is configured to acquire a video list based on the account identifier of the target account; and receive the video list from the video server and display videos in the video list in the video selection interface.

Optionally, the apparatus further includes a first acquisition module and a fourth display module.

The first acquisition module is configured to acquire, by a search control, an account to be searched.

The fourth display module is configured to display an account information interface corresponding to the account to be searched.

Optionally, the apparatus further includes a second acquisition module and a second sending module.

The second acquisition module is configured to, in response to a position adjust operation on a display region corresponding to the video frame in the live streaming frame, acquire a target display region indicated by the position adjust operation.

The second sending module is configured to send position information of the target display region to the live streaming server. The live streaming server is configured to insert the video frame in the target display region based on the position information.

Optionally, the apparatus further includes a fifth display module and a third sending module.

The fifth display module is configured to display a video close control in response to a trigger operation on the display region corresponding to the video frame in the live streaming frame.

The third sending module is configured to, in response to a trigger operation on the video close control, send a stop playback request to the video server, wherein the video server is configured to stop transmitting the target video to the live streaming server in response to the stop playback request, or send a stop playback instruction to the live streaming server, wherein the live streaming server is configured to stop inserting the video frame of the target video into the live streaming frame.

Optionally, the apparatus further includes a sixth display module and a seventh display module.

The sixth display module is configured to display a video switch control in response to a trigger operation on the display region corresponding to the video frame in the live streaming frame.

The seventh display module is configured to display the video selection interface in response to a trigger operation on the video switch control.

Figure 16:
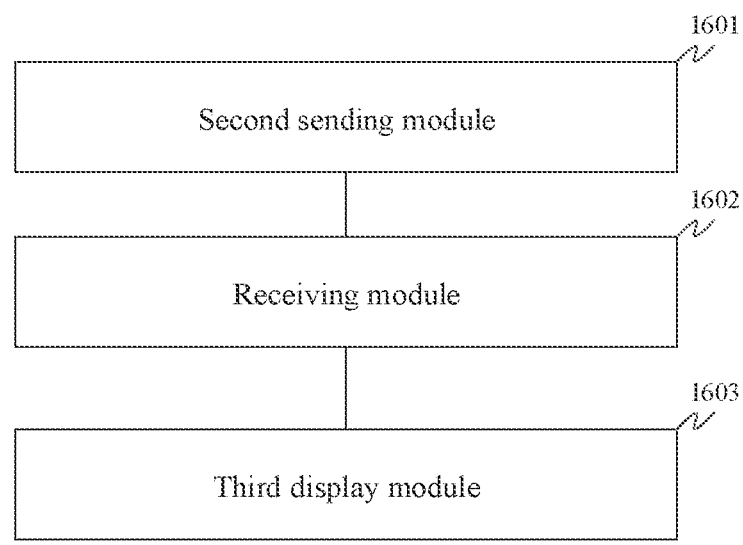
FIG. 16 is a schematic structural diagram of a video playback apparatus according to some exemplary embodiments of the present disclosure.

FIG. 16 is a schematic structural diagram of a video playback apparatus according to some exemplary embodiments of the present disclosure. Referring to FIG. 16, the apparatus includes a second sending module 1601, a receiving module 1602, and a third display module 1603.

The second sending module 1601 is configured to send a stream pull request. The stream pull request is configured to request a live streaming server to push a live stream.

The receiving module 1602 is configured to receive pushed live stream data sent by the live streaming server.

The third display module 1603 is configured to display a live streaming frame based on the pushed live stream data. A video frame of a target video is inserted into the live streaming frame. The target video is a video posted by a target account, and the target video is selected by an anchor client.

Optionally, the apparatus further includes an eighth display module.

The eighth display module is configured to display an account information interface corresponding to the target account in response to a trigger operation on a display region corresponding to the video frame in the live streaming frame. The account information interface does not support a select operation on a video.

In some exemplary embodiments, a terminal is further provided. The terminal includes a processor and a memory. The memory stores one or more computer instructions. The one or more computer instructions, when loaded and executed by the processor, cause the processor to perform the video playback method as described above.

Some embodiments of the present disclosure further provide a computer-readable storage medium, storing at least one instruction, at least one program, a code set, or an instruction set therein. The at least one instruction, the at least one program, the code set, or the instruction set, when loaded and executed by a processor, causes the processor to perform the video playback method as described above.

Some embodiments of the present disclosure further provide a computer program product or a computer program. The computer program product or the computer program includes one or more computer instructions, wherein the one or more computer instructions are stored in a computer-readable storage medium. The one or more computer instructions, when loaded and executed by a processor of a terminal from the computer-readable storage medium, cause the terminal to perform the video playback method as described above.

The serial numbers of the above embodiments of the present disclosure are merely for description and are not for the merits of the embodiments.

It should be understood by those skilled in the art that all or some of the steps of the information processing method in achieving the above embodiments can be implemented by hardware, or by instructing the relevant hardware by one re more programs. The one or more programs can be stored in a computer-readable storage medium. The storage medium mentioned above can be a read-only memory, a disk, or a light disk. The storage medium can be a non-volatile computer-readable storage medium or a non-transitory computer-readable storage medium. Described above are merely exemplary embodiments of the present disclosure, and are not intended to limit the present disclosure. Therefore, any modifications, equivalent substitutions, improvements, and the like made within the spirit and principles of the present disclosure shall be included in the protection scope of the present disclosure.

What is claimed is:

1. A video playback method, applicable to an anchor client, the method comprising:
    displaying a video selection interface in response to a video display operation on a target account, wherein the video selection interface comprises at least one video posted by the target account;
    sending a video playback request to a video server in response to a select operation on a target video in the video selection interface, wherein the video server is configured to transmit the target video to a live streaming server in response to the video playback request, and the live streaming server is configured to insert a video frame of the target video into a live streaming frame corresponding to the anchor client and push a live stream; and
    displaying the live streaming frame with the video frame inserted;
    wherein displaying the video selection interface in response to the video display operation on the target account comprises:
        displaying an account information interface corresponding to the target account in response to a select operation on the target account, wherein the account information interface comprises a video display control, the video display control being configured to trigger a playback of a video posted by a user account during live streaming; and
        displaying the video selection interface in response to a select operation on the video display control.

2. The method according to claim 1, wherein displaying the account information interface corresponding to the target account in response to the select operation on the target account comprises:
    displaying a viewer ranking list, wherein the viewer ranking list comprises at least one viewer account, a display order of the at least one viewer account being determined according to the number of virtual items contributed in a live streaming room; and displaying the account information interface corresponding to the target account in response to the select operation on the target account in the viewer ranking list.

3. The method according to claim 1, wherein displaying the video selection interface in response to the select operation on the video display control comprises:
sending a video list acquire request to the video server in response to the select operation on the video display control, wherein the video list acquire request comprises an account identifier of the target account, and the video server is configured to acquire a video list based on the account identifier of the target account;
receiving the video list from the video server; and
displaying a video in the video list in the video selection interface.

4. The method according to claim 1, wherein
the account information interface comprises a search control; and
upon displaying the account information interface corresponding to the target account, the method further comprises:
acquiring a to-be-searched account by the search control; and
displaying an account information interface corresponding to the to-be-searched account.

5. The method according to claim 1, wherein upon displaying the live streaming frame with the video frame inserted, the method further comprises:
acquiring, in response to a position adjust operation on a display region corresponding to the video frame in the live streaming frame, a target display region indicated by the position adjust operation; and
sending position information of the target display region to the live streaming server, wherein the live streaming server is configured to insert the video frame in the target display region based on the position information.

6. The method according to claim 1, wherein upon displaying the live streaming frame with the video frame, the method further comprises:
displaying a video close control in response to a trigger operation on a display region corresponding to the video frame in the live streaming frame; and
sending a stop playback request to the video server in response to a trigger operation on the video close control, wherein the video server is configured to, in response to the stop playback request, stop transmitting the target video to the live streaming server or send a stop playback instruction to the live streaming server, and the live streaming server is configured to stop inserting the video frame of the target video into the live streaming frame.

7. The method according to claim 1, wherein upon displaying the live streaming frame with the video frame inserted, the method further comprises:
displaying a video switch control in response to a trigger operation on a display region corresponding to the video frame in the live streaming frame; and
displaying the video selection interface in response to a trigger operation on the video switch control.

8. A video playback method, applicable to an anchor client, the method comprising:
sending a stream pull request to a live streaming server, wherein the stream pull request is configured to request the live streaming server to push a live stream;
receiving pushed live stream data from the live streaming server; and
displaying a live streaming frame based on the pushed live stream data, wherein a video frame of a target video is inserted into the live streaming frame, the target video being a video posted by a target account and selected by the anchor client;
wherein upon displaying the live streaming frame based on the live stream pushing data, the method further comprises:
displaying an account information interface corresponding to the target account in response to a trigger operation on a display region corresponding to the video frame in the live streaming frame, wherein the account information interface does not support a select operation on a video.

9. A video playback terminal, comprising:
a processor; and
a memory storing at least one instruction, at least one program, a code set, or an instruction set therein;
wherein the at least one instruction, the at least one program, the code set, or the instruction set, when loaded and executed by the processor, causes the processor of the terminal to perform the video playback method as defined in any one of claim 1.

10. A non-transitory computer-readable storage medium, storing at least one instruction, at least one program, a code set, or an instruction set therein;
wherein the at least one instruction, the at least one program, the code set, or the instruction set, when loaded and executed by a processor, causes the processor to perform the video playback method as defined in claim 1.

11. A video playback terminal, comprising:
a processor; and
a memory storing at least one instruction, at least one program, a code set, or an instruction set therein;
wherein the at least one instruction, the at least one program, the code set, or the instruction set, when loaded and executed by the processor, causes the processor of the terminal to perform the video playback method as defined in claim 8.

12. A non-transitory computer-readable storage medium, storing at least one instruction, at least one program, a code set, or an instruction set therein;
wherein the at least one instruction, the at least one program, the code set, or the instruction set, when loaded and executed by a processor, causes the processor to perform the video playback method as defined in claim 8.

13. The video playback terminal according to claim 9, wherein the at least one instruction, the at least one program, the code set, or the instruction set, when loaded and executed by the processor, causes the processor of the terminal to perform:
displaying a viewer ranking list, wherein the viewer ranking list comprises at least one viewer account, a display order of the at least one viewer account being determined according to the number of virtual items contributed in a live streaming room; and
displaying the account information interface corresponding to the target account in response to the select operation on the target account in the viewer ranking list.

14. The video playback terminal according to claim 9, wherein the at least one instruction, the at least one program, the code set, or the instruction set, when loaded and executed by the processor, causes the processor of the terminal to perform:

sending a video list acquire request to the video server in response to the select operation on the video display control, wherein the video list acquire request comprises an account identifier of the target account, and the video server is configured to acquire a video list based on the account identifier of the target account;

receiving the video list from the video server; and displaying a video in the video list in the video selection interface.

15. The video playback terminal according to claim 9, wherein the account information interface comprises a search control; and the at least one instruction, the at least one program, the code set, or the instruction set, when loaded and executed by the processor, causes the processor of the terminal to further perform:

acquiring a to-be-searched account by the search control; and displaying an account information interface corresponding to the to-be-searched account.

16. The video playback terminal according to claim 9, wherein the at least one instruction, the at least one program, the code set, or the instruction set, when loaded and executed by the processor, causes the processor of the terminal to further perform:

acquiring, in response to a position adjust operation on a display region corresponding to the video frame in the live streaming frame, a target display region indicated by the position adjust operation; and sending position information of the target display region to the live streaming server, wherein the live streaming server is configured to insert the video frame in the target display region based on the position information.

17. The video playback terminal according to claim 9, wherein the at least one instruction, the at least one program, the code set, or the instruction set, when loaded and executed by the processor, causes the processor of the terminal to further perform:

displaying a video close control in response to a trigger operation on a display region corresponding to the video frame in the live streaming frame; and sending a stop playback request to the video server in response to a trigger operation on the video close control, wherein the video server is configured to, in response to the stop playback request, stop transmitting the target video to the live streaming server or send a stop playback instruction to the live streaming server, and the live streaming server is configured to stop inserting the video frame of the target video into the live streaming frame.

18. The video playback terminal according to claim 9, wherein the at least one instruction, the at least one program, the code set, or the instruction set, when loaded and executed by the processor, causes the processor of the terminal to further perform:

displaying a video switch control in response to a trigger operation on a display region corresponding to the video frame in the live streaming frame; and displaying the video selection interface in response to a trigger operation on the video switch control.

\* \* \* \* \*